(12) United States Patent
Tincher et al.

(10) Patent No.: US 9,038,455 B2
(45) Date of Patent: May 26, 2015

(54) SYSTEM AND METHOD FOR PRODUCT LEVEL MONITORING IN A CHEMICAL DISPENSING SYSTEM

(75) Inventors: Terry Tincher, Lebanon, OH (US); William Sand, Cincinnati, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 481 days.

(21) Appl. No.: 13/164,878

(22) Filed: Jun. 21, 2011

(65) Prior Publication Data

US 2012/0324995 A1 Dec. 27, 2012

(51) Int. Cl.
*G01F 23/26* (2006.01)
*D06F 39/02* (2006.01)
*G01F 23/24* (2006.01)
*D06F 33/02* (2006.01)

(52) U.S. Cl.
CPC .............. *D06F 39/02* (2013.01); *G01F 23/243* (2013.01); *D06F 33/02* (2013.01)

(58) Field of Classification Search
USPC ........................................................ 73/34, 45
See application file for complete search history.

(56) References Cited

U.S. PATENT DOCUMENTS

| | | | | |
|---|---|---|---|---|
| 3,815,248 A * | 6/1974 | Kulig | ............................... | 33/522 |
| 4,235,106 A * | 11/1980 | Maltby et al. | ............... | 73/304 C |
| 4,879,902 A * | 11/1989 | Loniello | ..................... | 73/304 R |
| 5,449,017 A * | 9/1995 | Collins et al. | ................. | 137/312 |
| 5,939,620 A * | 8/1999 | Strand | ............................. | 73/49.2 |
| 6,274,033 B1 * | 8/2001 | Hudgin | ........................... | 210/86 |
| 6,938,478 B2 * | 9/2005 | Arias | .......................... | 73/304 R |
| 2004/0098811 A1 * | 5/2004 | Tuttle et al. | ........................ | 8/158 |
| 2005/0268700 A1 * | 12/2005 | Strand et al. | ................... | 73/49.2 |
| 2010/0278667 A1 * | 11/2010 | Gault et al. | ............... | 417/477.6 |
| 2011/0127210 A1 * | 6/2011 | Suzuki | .......................... | 210/438 |

FOREIGN PATENT DOCUMENTS

| | | |
|---|---|---|
| DE | 8700406 | 4/1987 |
| EP | 2128575 | 12/2009 |
| WO | 03006144 | 1/2003 |

* cited by examiner

*Primary Examiner* — Peter Macchiarolo
*Assistant Examiner* — Mohammed Keramet-Amircola
(74) *Attorney, Agent, or Firm* — Wood, Herron & Evans, LLP

(57) ABSTRACT

A system and method for monitoring the levels of product in a chemical dispensing system. A probe assembly is operatively disposed in a container holding product to be dispensed. A detection circuit including an oscillator sensitive to the impendence coupled to the detector is selectively coupled to the probe assembly and produces a signal in response to the impedance of the probe assembly indicating if the level of product in the container has dropped below the probe assembly. The probe assembly includes conductive probes formed from corrosion resistant material infused with carbon and separated by an angle. The level of the first and second conductive probes is adjustable to provide control over the level of product to be detected. Multiple probe assemblies may be selectively coupled to the detection circuit in a repeating sequence by a multi-probe monitoring unit to allow monitoring of multiple containers by a single remote alarm.

13 Claims, 12 Drawing Sheets

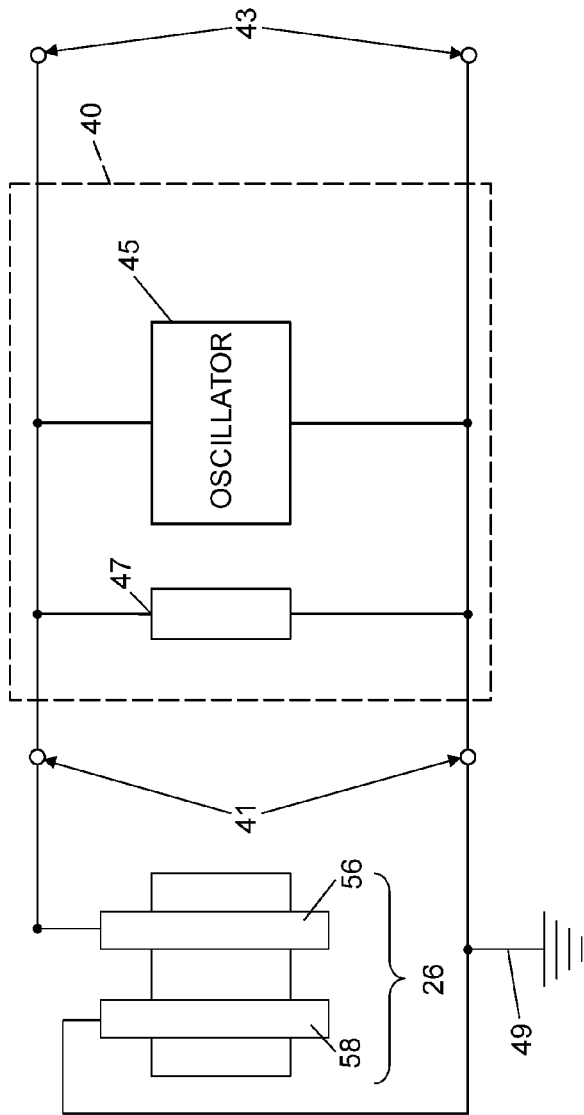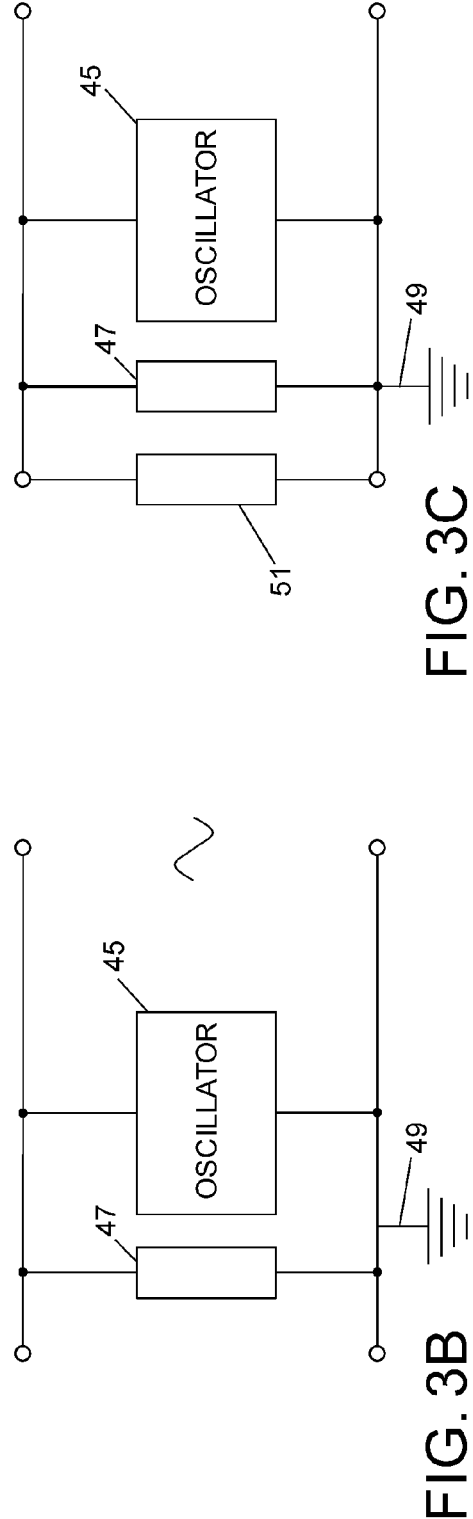
FIG. 3A
FIG. 3B
FIG. 3C

SYSTEM AND METHOD FOR PRODUCT LEVEL MONITORING IN A CHEMICAL DISPENSING SYSTEM

FIELD OF THE INVENTION

The invention relates generally to chemical dispensing systems for laundry, ware-wash, and healthcare, and more particularly to detecting amounts of product in the chemical dispensing system.

BACKGROUND OF THE INVENTION

The dispensing of liquid chemical products from one or more chemical receptacles is a common requirement of many industries, such as the laundry, textile, ware wash, healthcare instruments, and food processing industries. For example, in an industrial laundry facility, one of several operating washing machines will require, from time to time, aqueous solutions containing quantities of alkaloid, detergent, bleach, starch, softener and/or sour. Increasingly, such industries have turned to automated methods and apparatus systems for dispensing chemical products. Such automated methods and apparatus systems provide increased control of product use and reduce human contact with potentially hazardous chemicals.

Contemporary automatic chemical dispensing systems used in industry rely on pumps to deliver the liquid chemical products from a storage container. Generally, these pumps deliver raw product directly to a machine for use or to a dilution manifold or container where the product is mixed with a diluent, typically water. Such systems are relatively simple in concept, but they can be expensive to build and operate. A number of methods for the control of dispensing these chemical products have been developed and employed and are well known in the art.

In many contemporary chemical dispensing systems, the chemical products are stored in containers and probe assemblies are used to monitor the level of the product in these containers. One common type of probe assembly includes two probes separated by a distance so that the probe assembly has a high input impendence when exposed to air. Because the products are typically conductive, the input impendence of the probe assembly is lower when the probes are in contact with the product. To provide an indication of the level of product in a container, the probe assembly is mounted in the container so that the probes are in contact with the product when the container is sufficiently full. When the level of product drops below the probes, the probes are exposed to air, increasing the input impedance of the probe assembly. To notify the operator of the chemical dispensing system that the container is running low on product, a monitoring device is connected to the probe assembly. In this type of detection system, the monitoring device is configured to detect the increase in the input impedance of the probe assembly, and may thereby notify an operator that the product is about to run out by providing an alarm.

The operator may be responsible for multiple chemical dispensing systems, each of which will typically be located remotely from the operator's workspace. In addition, the machines connected to each of the chemical dispensing systems may require several different chemical products in order to perform properly. The monitoring system will therefore typically include multiple probe assemblies and monitoring devices so that each of several containers containing different chemical products is individually monitored. Thus, a typical monitoring system may require several cable runs from multiple locations in order to provide full coverage of all the containers the operator is responsible for maintaining. Increasing the number of containers and locations that must be monitored will further result in increased cabling requirements. This large number of cable runs will increase the complexity and expense of the monitoring system, and may also reduce the monitoring system's reliability due to the increased number of connections and potential failure points.

Further reliability issues may arise from use of conventional probe assembly designs. Because the aforementioned level monitoring systems rely on the measured input impedance of the probe assembly to detect the level of the product, anything that affects this measurement can have a negative impact on the reliability of the system, Probe assemblies may experience reliability issues over time from the product attacking the probes due to the corrosive nature of many of the chemicals typically found in the product. Even when the probes utilize resilient types of materials such as stainless steel or graphite, the probes are generally being electrically charged by the monitoring device in order to measure the capacitance or input impedance of the probe assembly. This electrical charge may result in electrolysis occurring at the electrodes, which will tend to foul even a chemically resistant material after a sufficient period use. The product may also be sufficiently viscous so that the product clings to the probes or leaves a semi-dried residue, causing the probes to indicate that sufficient product is present in the container after the level of the product has dropped below the probes.

Fouled or otherwise compromised probe assemblies and/or monitoring devices may cause erroneous readings. These erroneous readings may result in false alarms and/or failures to notify the operator that a product is running out. These errors can be addressed by performing continuous maintenance of removing and cleaning the probe assembly, undesirably increasing operational expenses. False alarms may result in unnecessary trips to refill a container that already contains sufficient product, which also increases operating expenses. Frequent false alarms may also cause operators to either ignore or disconnect the monitoring system, increasing the likelihood that a container running low on product will go unnoticed.

Large numbers of cables and compromised probe assemblies may thus collectively reduce the reliability and increase the cost of chemical product level monitoring systems. For the aforementioned reasons, unreliable monitoring systems may result in machines attached to the chemical dispensing system running without the required amounts of the chemical products being dispensed. The performance of the machines fed by the chemical dispensing system may thereby be adversely affected due to too little of the product being dispensed, reducing the quality of machine's output and increasing expenses by requiring goods to be re-processed through the affected machine.

Therefore, there is a need in the art for improved monitoring system components and methods that more accurately and reliably detect the presence of chemical products over time for use with chemical dispensing systems.

SUMMARY OF THE INVENTION

In one aspect of the invention, a multi-probe monitoring unit capable of monitoring multiple probe assemblies is provided for use in a chemical dispenser monitoring system. The multi-probe monitoring unit provides multiple electrical input ports to which probe assemblies may be connected, facilitating system scalability and remote monitoring of multiple containers. The multi-probe monitoring unit is configured to monitor multiple probe assemblies at the location of the chemical dispensing machine and provides an interface for connecting a remote alarm unit over a single cable. The multi-probe monitoring unit thereby provides a mechanism whereby a single remote alarm may be used notify the operator that any one of many container(s) serving a particular chemical dispensing machine is running low on product. To this end, the multi-probe monitoring unit includes a detection circuit, a switch matrix having a plurality of electrical input ports, and a processor operatively coupled to the detection circuit and the switch matrix. Each monitored probe assembly is connected to an electrical input port on the switch matrix and provides a low impedance at the electrical input port when the probe assembly is in contact with the product in the container and a high impedance when the probe assembly is not in contact with the product—i.e., when the product falls out of contact with the probe assembly. Using the switch matrix, the processor selectively couples the electrical input port associated with each probe assembly to the detector in a sequential manner. The detector thereby provides an indication to the processor of the product level status in each monitored container. If a low product condition is detected in any of the containers, the multi-probe monitoring unit will supply a signal to the remote alarm unit, notifying the operator that one of the containers is low on product.

In a second aspect of the invention, the probe assembly for detecting a level of a product in a container is configured to resist corrosion, fouling, and false readings caused by viscous and/or corrosive products. The probes are formed from a material resistant to chemical attacks from the monitored product, such as polypropylene. To provide the needed electrical connection between the product and the detection circuitry, the probe is preferably rendered conductive such as with a conductive substance like carbon preferably infused into the probe material to render it conductive. The probe assembly is further constructed to have a unique product shedding configuration that further reduces false readings that may be caused by viscous products clinging to the probes.

In a third aspect of the invention, a method of detecting a minimum level of product in a container is provided that involves coupling a probe assembly to a detection circuit that includes an oscillator. The oscillator is designed so that it will oscillate when the electrical impedance provided to the input of the detection circuit is sufficiently high, such as when the input of the detection circuit is connected to a probe assembly that is not in contact with the product. The detection circuit thereby provides a signal to the processor indicating that the product level has dropped below a minimum acceptable level. In contrast, when the input of the detection circuit is connected to a probe assembly that is in contact with the product, the additional electrical load provided by the probe assembly to the input causes the oscillator to change in frequency (depending on the conductivity of the fluid) or to stop running. Because of the nature of the loading of the resistive probes in the oscillator circuitry, the voltages placed on the probes by the detection circuit are minimized while the probes are in contact with the product, thereby reducing electrolysis and probe fouling.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 3A is a schematic of a detection circuit in FIG. 2 including an oscillator with an input coupled to a probe assembly.

FIG. 3B is a schematic of the detection circuit in FIG. 3A with a high impedance being provided by the probe assembly showing the oscillator in an oscillating state.

FIG. 3C is a schematic of the detection circuit in FIG. 3A with an impedance being provided by the probe assembly that causes the oscillator to be in a different state to include a non-oscillating state.

Figure 1:
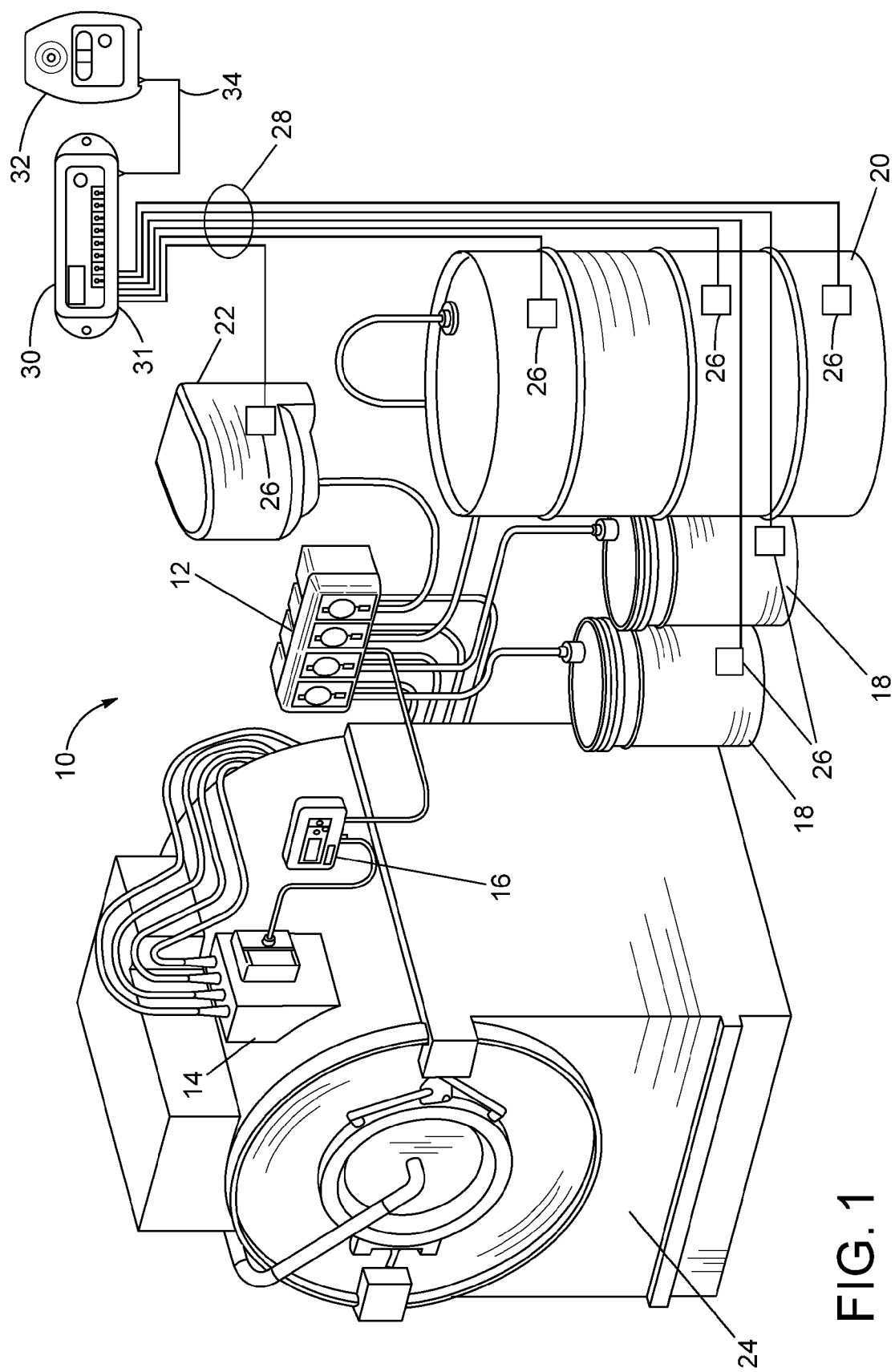
FIG. 1 is an illustration of an exemplary chemical dispensing system including a multi-probe monitoring unit, probe assemblies, and a standalone unit serving as remote alarm.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and a clear understanding. In particular, thin features may be thickened, for example, for clarity or illustration,

DETAILED DESCRIPTION OF THE INVENTION

Embodiments of the invention provide a system for monitoring a level of product in containers supplying a chemical dispensing system that assists in overcoming the difficulties with contemporary probes and product level monitoring systems. The probes utilize industry proven materials, such as polypropylene, to substantially reduce the issues related to chemical attacks on the probes, but that are modified so that the probes are electrically conductive. The probe assemblies also have a unique mechanical configuration that reduces false readings caused by viscous solutions clinging to the probes, increasing the reliability of chemical level indications over contemporary probes. The probe assemblies consistent with embodiments of the invention are used with detection circuitry that provides an indication that the level of a chemical in a container of the chemical dispensing system has dropped below a minimum level, indicating that the container is out or about to run out of the chemical.

The detection circuitry minimizes probe fouling caused by electrolysis, which coupled with the improved probe materials and shape, further increases the reliability of product minimum level indications by the probe assemblies. A multi-probe monitoring unit allows a single detection circuit to monitor multiple probe assemblies, reducing the cost and complexity of the system. The multi-probe monitoring unit may thereby provide system operators with indications of whether a sufficient level product remains in multiple containers of the chemical dispensing system or an indication that one or more containers is out of a chemical. The multi-probe monitoring unit is configured to interface with a remote alarm so that the operator may be notified that any one of a plurality of container(s) is running low on product without visiting the physical location of chemical dispensing unit. The remote alarming capability may thereby improve worker productivity by reducing the need for site visits. By consolidating the monitoring of multiple probe assemblies into a single multi-probe monitoring unit, system set up and monitoring may also be simplified, with a resulting improvement in the cost of the system and the reliability of the low product alarming.

Turning now to the drawings, FIG. 1 illustrates an exemplary chemical dispensing system 10 shown in a typical deployment with a washing machine for use with embodiments of the invention. One of ordinary skill in the art will recognize that this system 10 is only for illustration purposes and that embodiments of the invention will be used with other configurations of chemical dispensing systems. The base configuration of the chemical dispensing system 10 includes a pump interface 12, a machine interface 14, and a controller 16. The controller 16 connects through wiring to the pump interface 12 and the machine interface 14. The controller 16 receives inputs from the machine interface 14 and sends instructions to the pump interface 12. The pump interface 12 generally includes a plurality of suitable pumps for providing product to a machine 24 from the various chemical storage units 18, 20, 22, and a valve connected to a dilutant source (not shown) to control delivery of dilutant the machine 24. The machine 24 may be a laundry machine, a ware-wash machine, a healthcare wash, or any other type of machine that uses dispensed chemicals.

Figure 4A:
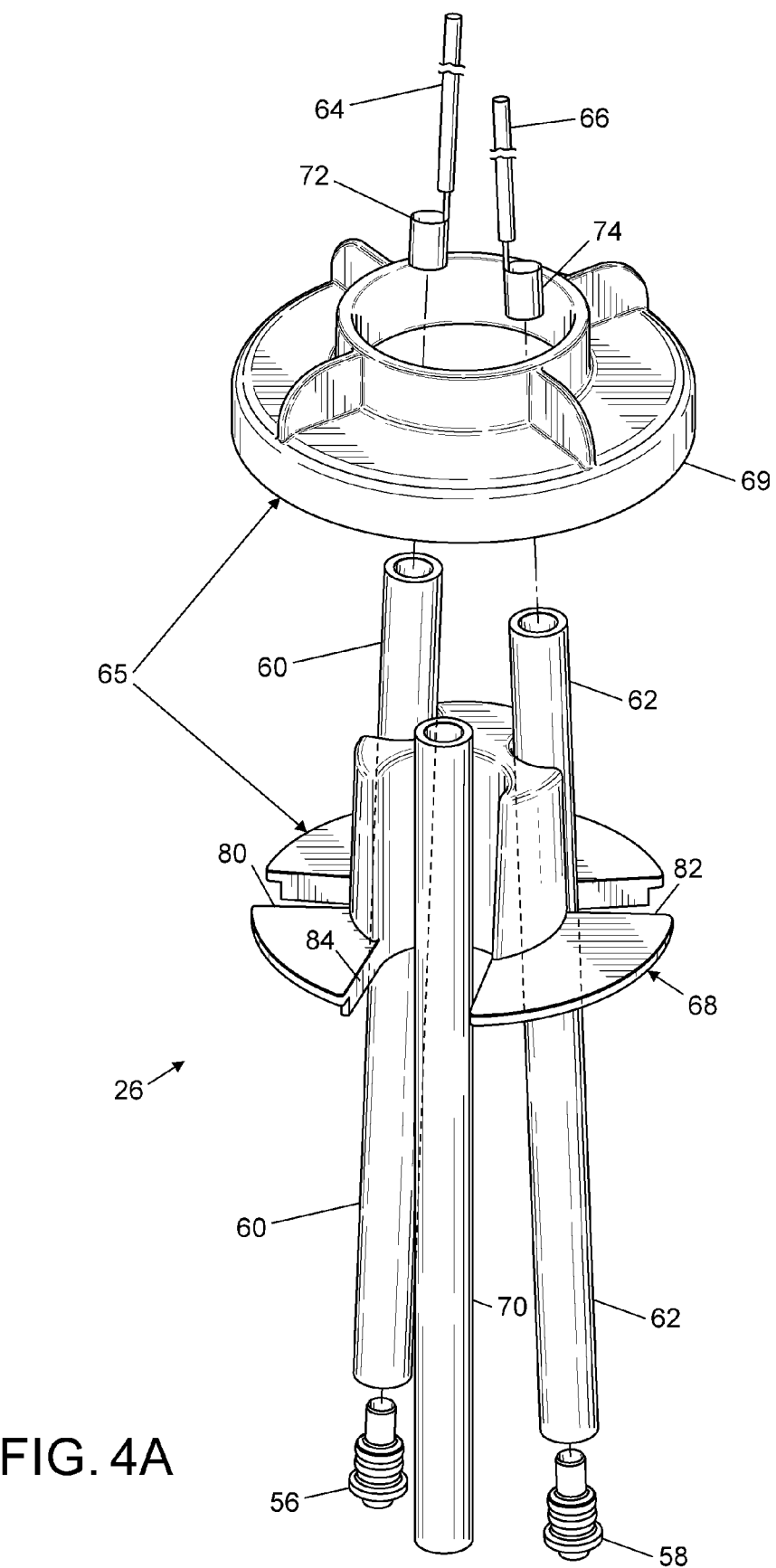
FIG. 4A is an exploded isometric view of a conductive probe assembly for use in the containers of FIG. 1.
Figure 4B:
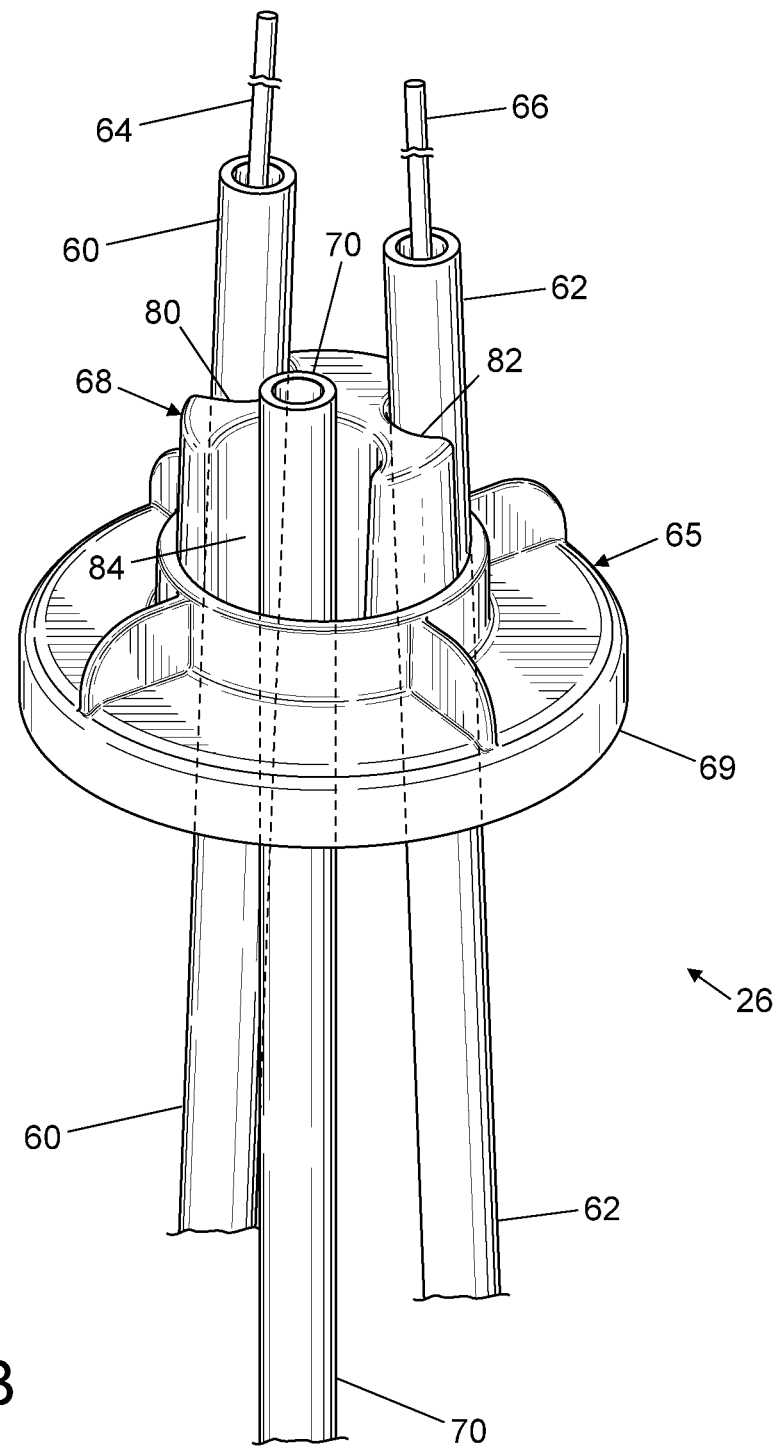
FIG. 4B is an isometric view of the top portion of the probe assembly of FIG. 4A.

Probe assemblies 26 (such as in FIG. 4A) are operatively disposed in containers 18, 20, 22 and are electrically connected to a multi-probe monitoring unit 30 through communication lines 28. The multi-probe monitoring unit 30 may operate alone, or may be electrically coupled to a standalone unit 32 though a communication line 34 to provide a remote alarming capability. The standalone unit 32 may be located at the washing machine 24, or the standalone unit may be located remotely from the chemical dispensing system 10, as shown in FIG. 1. In cases where a single probe assembly 26 is used with the chemical dispensing system 10, such as when there is only a single container of chemicals for which monitoring is desired, the standalone unit 32 is capable of monitoring a single probe assembly 26 that is electrically connected directly to the standalone unit 32 without the need for a multi-probe monitoring unit 30. In most cases however, a multi-probe monitoring unit 30 will be utilized with chemical dispensing systems having multiple containers and/or containers with multiple probe assemblies 26.

Figure 2:
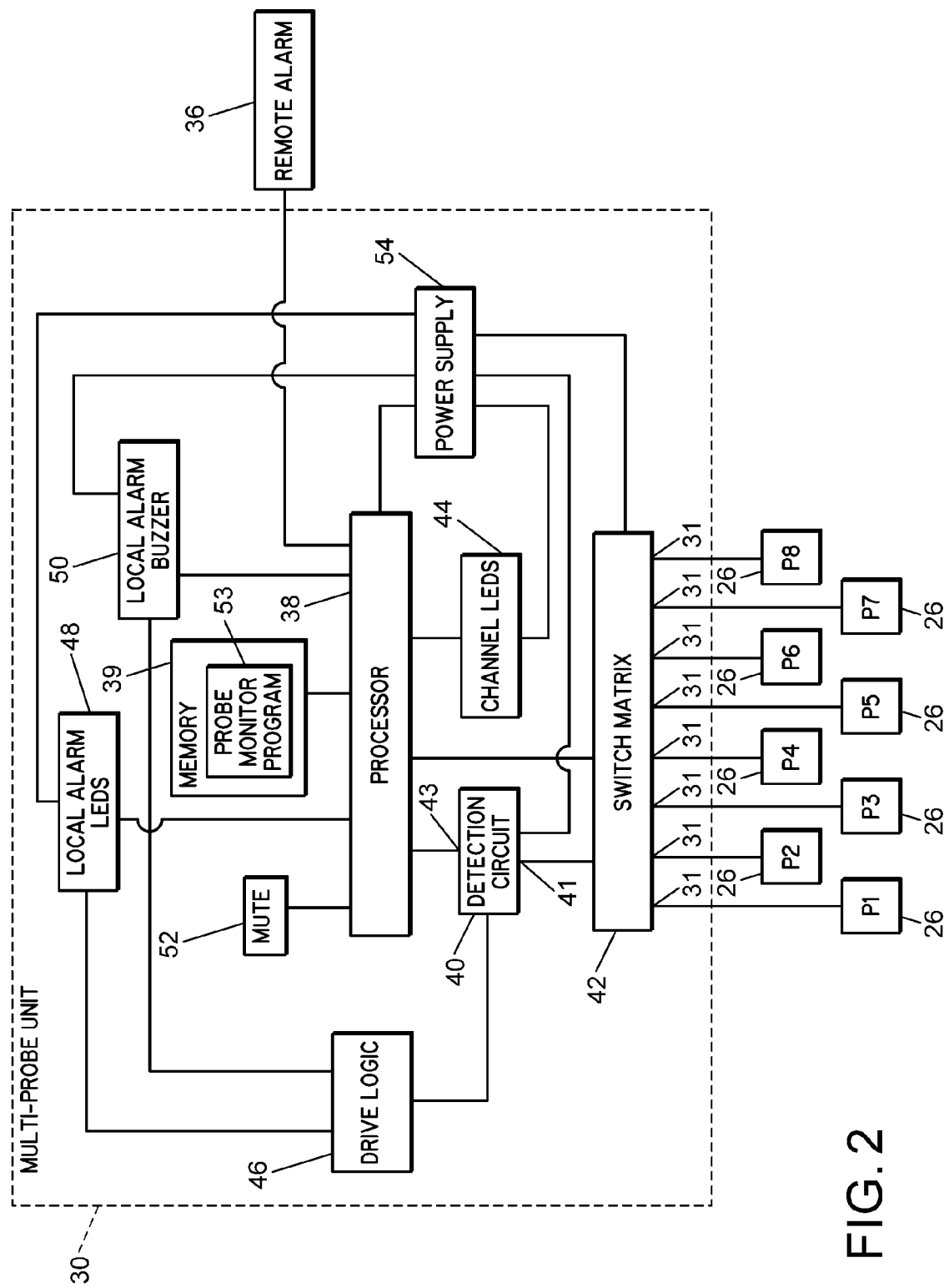
FIG. 2 is a schematic diagram of the multi-probe monitoring unit in FIG. 1 including a processor, a detection circuit, and a switch matrix.

Referring now to FIG. 2 and in accordance with an embodiment of the invention, a block diagram of the multi-probe configuration includes the multi-probe monitoring unit 30 having multiple electrical input ports 31, a remote alarm 36 (which may be provided by standalone unit 32), and multiple probe assemblies 26 each coupled to one of the monitoring ports 31. The multi-probe monitoring unit 30 includes a processor 38, a detection circuit 40, a switch matrix 42, channel light emitting diodes (LEDs) 44, drive logic 46, local alarm LEDs 48, a local alarm buzzer 50, a mute button 52, and a power supply 54 that provides suitable voltages to the various components of the multi-probe monitoring unit 30. Processor 38 may be a microprocessor, microcontroller, programmable logic or any other suitable device that manipulates signals based on operational instructions that are stored in a memory 39. The memory 39 may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing digital information. The memory 39 may also be integrated with the processor 38.

The processor 38 executes or otherwise relies upon computer program code, instructions, or logic to execute the functions of the multi-probe monitoring unit 30. To this end, a probe monitor program 53 may reside in memory 39 and may be executed by the processor 38. The probe monitor program 53 controls and manages the other components of the multi-probe monitoring unit 30 so as to provide a monitoring function for the probe assemblies 26. To provide control over the probe assemblies 26, the processor 38 is in electrical communication with the switch matrix 42, which includes one or more suitable switches such as analog complementary metal-oxide-semiconductor (CMOS) switches. The switches connect each electrical input port 31 of multi-probe monitoring unit 30 to an input 41 of the detection circuit 40. The probe monitor program 53 thereby selectively electrically couples an individual electrical input port 31 of the multi-probe monitoring unit 30 to the detection circuit 40 by outputting a signal that closes the appropriate switch in the switch matrix 42.

The channel LEDs 44 may comprise a plurality of LEDs electrically coupled to the processor 38. The probe monitor program 53 associates each switch in the switch matrix 42 with a channel LED 44, which allows the processor 38 to periodically illuminate the appropriate channel LED 44 when that port 31 is coupled to the detection circuit 40. The probe monitor program 53 thereby provides a visual indication of which probe assembly 26 is currently being monitored or polled by the multi-probe monitoring unit 30. The probe monitor program 53 also illuminates the appropriate channel LED 44 to indicate a product out or other condition associated with a particular container 18, 20, 22.

The processor 38 is also electrically coupled to the local alarm LEDs 48 and the local alarm buzzer 50 so that the probe monitor program 53 may provide visual and audible indications of a product low level condition within the chemical dispensing system 10. The probe monitor program 53 also provides a product low level indication by activating the remote alarm 36 (when connected), which will typically be located in the operator's office or other desired remote location.

A mute button 52 allows the operator to silence the audible alarm. In some embodiments, the remote alarm 36 may be provided by a stand-alone unit 32 having an input port electrically coupled to the processor 38. To this end, the multi-probe monitoring unit 30 is configured to provide a signal to an electrical input port of the stand-alone unit 32 when the probe monitor program 53 determines that the product level in one of the monitored containers is below the minimum level set point. As will be described in more detail below, this signal will cause the stand-alone unit 32 to sound an alarm. The probe monitor program 53 is configured to provide different mute responses depending on how long or how many times the mute button 52 is pressed. By way of example, in some embodiments of the invention, the first time the mute button 52 is pressed, the alarm might be silenced for a short period, such as an hour. If the mute button 52 is held down for a length of time, such as 3-4 seconds, the alarm might be silenced for a longer period, such as a weekend. To provide an indication that the local alarm buzzer 50 has been muted, the local alarm LED's 48 will flash at a slower rate than normal. The rate of flashing is further adjusted so that the local alarm LED's 48 flash at a slower rate when a long duration alarm silencing period has been activated (such as a weekend) than when a short duration silencing period has been activated (such as an hour).

Referring now to FIGS. 3, 3A and 3B and in accordance with an embodiment of the invention, the detection circuit 40 includes a low frequency oscillator that includes an active element, or oscillator 45 and a load element 47. The oscillator 45 may include a CMOS inverter or any other suitable device capable of producing an oscillation when coupled to load element 47. Load element 47 may be a resistor-capacitor (RC) circuit or some other suitable circuit that provides a suitable load or feedback to the oscillator 45 to cause the oscillator 45 to oscillate. The detection circuit 40 produces an oscillation when a high impedance electrical load is present on the input 41, such as an electrical load with an impedance greater than 5 megohms. The detection circuit 40 thereby provides a low frequency oscillation signal when the quality factor of the oscillator 45 is sufficiently unaltered by the electrical load from a probe assembly 26 that is not in contact with a monitored product. When an electrical load that has a high impedance coupled to the input 41, the oscillator 45 comprising detection circuit 40 is tuned to oscillate at a nominal operating frequency, such as about 10 Hz, for example.

A pair of conductive probes 56, 58 comprising the probe assembly 26 are connected to the detection circuit 40. The probe assembly 26 is connected across the input 41 of the detection circuit 40 so that one probe 56 is connected to one side of load element 47 and the other probe 58 is connected to the other side of load element 47, which may also be coupled to a reference ground 49. When the probe assembly 26 is suspended in air, such as when the chemicals in the monitored container 18, 20, 22 have dropped below the probe assembly 26, the impedance of the probe assembly 26 as seen by the detection circuit 40 has a low loading effect on the oscillator 45. The quality factor of the oscillator 45 is thus relatively unaffected by the presence of the probe assembly 26 so that the detection circuit 40 outputs a time varying voltage signal at the nominal frequency as illustrated in the schematic diagram of FIG. 3A. However, when one or both of the probes 56, 58 are in contact with a conductive solution, an impedance 51 from the probes 56, 58 is seen by the detection circuit 40. A typical impedance between the probes 56, 58 when in contact with product will be between 10 kilohms and 1 megohms. The impedance 51 will lower the quality factor of the oscillator 45, which changes the operating parameters of the oscillator 45 due to the parallel loading effect of the probe assembly 26. These changed parameters will cause the oscillator 45 to oscillate at a frequency different from the nominal frequency or to cease oscillating depending on the load presented by the probe assembly 26, as illustrated in the schematic diagram of FIG. 3B. Thus, in response to being coupled to a probe assembly 26 that is in contact with product, the detection circuit 40 will output a signal having a different frequency or that stops varying altogether, such a constant voltage at ground potential. This change in the output of the detection circuit 40 provides an indication of the presence of absence of product at the probe assembly 26.

In some embodiments of the invention, the output 43 of the detection circuit 40 is fed into additional drive logic 46 (FIG. 2), which is designed to drive LEDs or buzzers directly based on the output of the detection circuit 40. These LEDs or buzzers thereby provide indications of the operating states of the dispensing system. In other embodiments of the invention, the output 43 of the detection circuit 40 is provided to an input port of processor 38 to provide control of the same operation. In embodiments with multiple probe assemblies 26, each of the probe assemblies 26 is selectively coupled to the detection circuit 40 by the switch matrix 42, allowing the processor 38 to cycle through all of the probes.

Figure 4C:
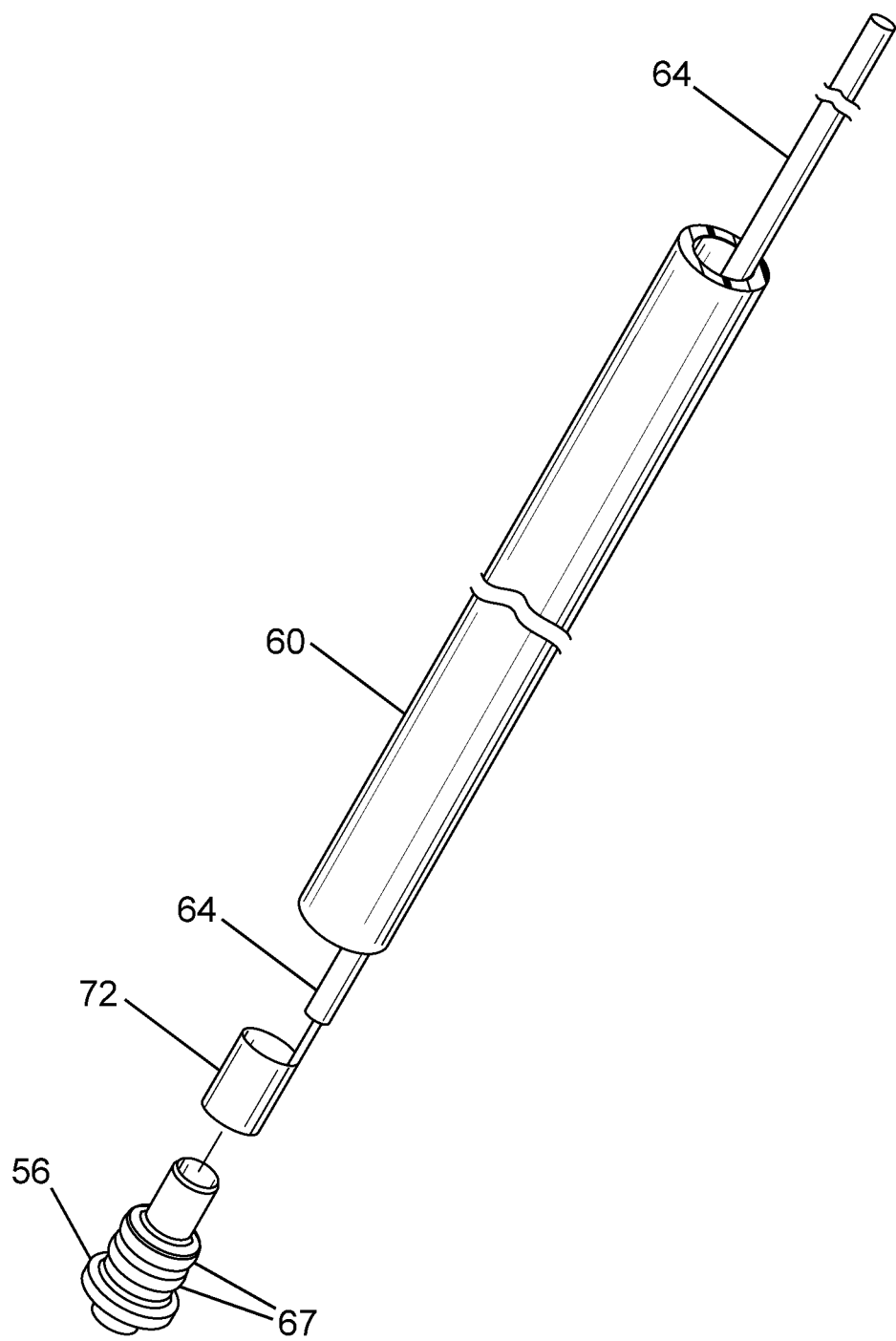
FIG. 4C is an exploded view of a conductive probe component of the probe assembly illustrated in FIGS. 4A and 4B.

Referring now to FIGS. 4A-4E and in accordance with an embodiment of the invention, probe assembly 26 includes probes 56, 58, extension tubes 60, 62, electrical leads 64, 66 from respective probes 56, 58, a cap 68, and a lid 69. A product pickup tube 70 having sufficient length to extend to the bottom of the associated container may be inserted through a channel 84 in the cap 68. The product in the container 18, 20, 22 is thereby be fluidically coupled to the pump interface 12 through the product pickup tube 70. The probes 56, 58 may be constructed from polypropylene, which is industry proven to be resistant to chemical attacks from the products typically used in the chemical dispensing system 10. To provide the needed electrical connection between the product and the detection circuitry, a conductive material, such as carbon or carbon fibers, may be infused into the polypropylene. This material has the durability to be placed into harsh chemical environments, while the carbon imparts conductivity to the material. For example, carbon black may be added to polypropylene in an amount equal to or less than about 16% by weight of the resulting material to provide a chemically resistant conductive material. The probes thereby provide a reliable electrical connection at a given resistance when the probes 56, 58 are electrically coupled by contact with the product. As best illustrated in FIG. 4C, to provide a watertight seal when the probes 56, 58 are inserted into the extension tubes 60, 62, the probes 56, 58 are formed with one or more circumferential rings 67, which may be barbed rings. Although the probe 56 is shown with two rings in FIG. 4C, there may be 1 ring or more than 2 rings and embodiments of the invention are not limited to probes having 2 rings. The rings 67 are defined so that they provide a water tight seal when the probes 56, 58 are inserted into the extension tubes 60, 62.

Extension tubes 60, 62 may be formed from polypropylene or other suitable material resistant to chemical attack, and are sufficiently rigid so as to maintain the positions of probes 56, 58 within their associated container. Electrical leads 64, 66 are formed from insulated wire or other suitable conductor, and are located within the extension tubes 60, 62 to prevent contact with the product. Electrical leads 64, 66 are electrically coupled to their corresponding conductive probes 56, 58 by clip leads 72, 74 to provide an electrical connection between the probes 56, 58 and the multi-probe monitoring unit 30 or standalone unit 32, as the case may be.

The chemical cap assembly 65 is designed to accommodate several common size container openings and thread sizes. The chemical cap assembly 65 includes a cap 68 and a lid 69. The cap 68 is configured so that it will couple to standard chemical container openings and is held in place by the lid 69. The lid 69 is in the form of a threaded ring that can rotate while the cap 68 remains stationary to facilitate securing the cap 68 to standard threaded container openings without twisting the tubes and/or wires passing through the cap

68. As best illustrated in FIG. 4E, the cap 69 includes channels 80, 82 that provide a friction fit with extension tubes 60, 62 to facilitate adjusting the insertion depth of the extension tubes 60, 62. The probes 56, 58 may thereby be located at a desired distance from the container bottom by simply sliding the extension tubes 60, 62 to adjust their insertion depth. Advantageously, this allows the system operator to control the product level at which a low product alarm is triggered.

Figure 4D:
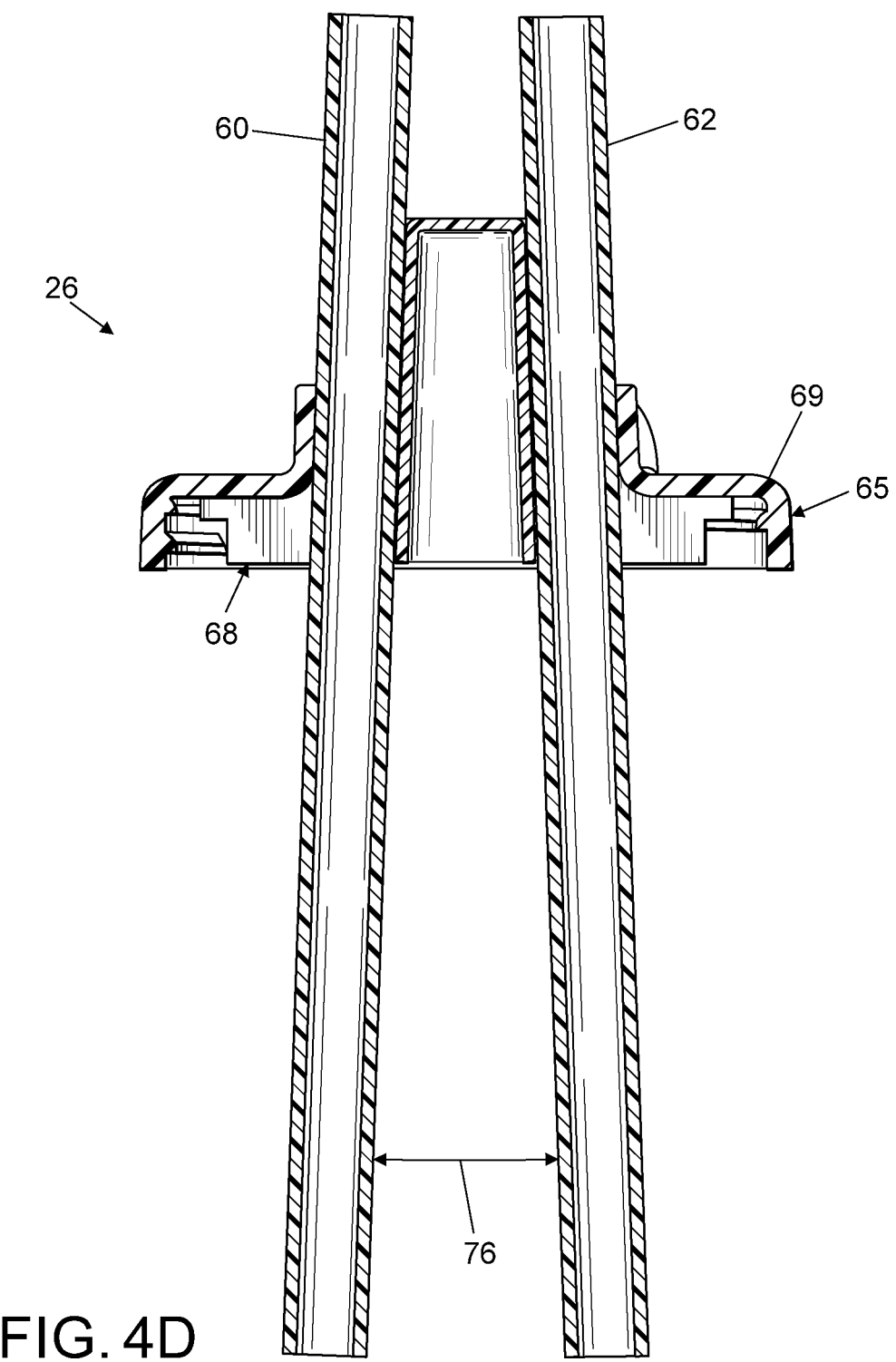
FIG. 4D is a cross-sectional diagram of the probe assembly in FIG. 4B illustrating a draft angle.
Figure 4E:
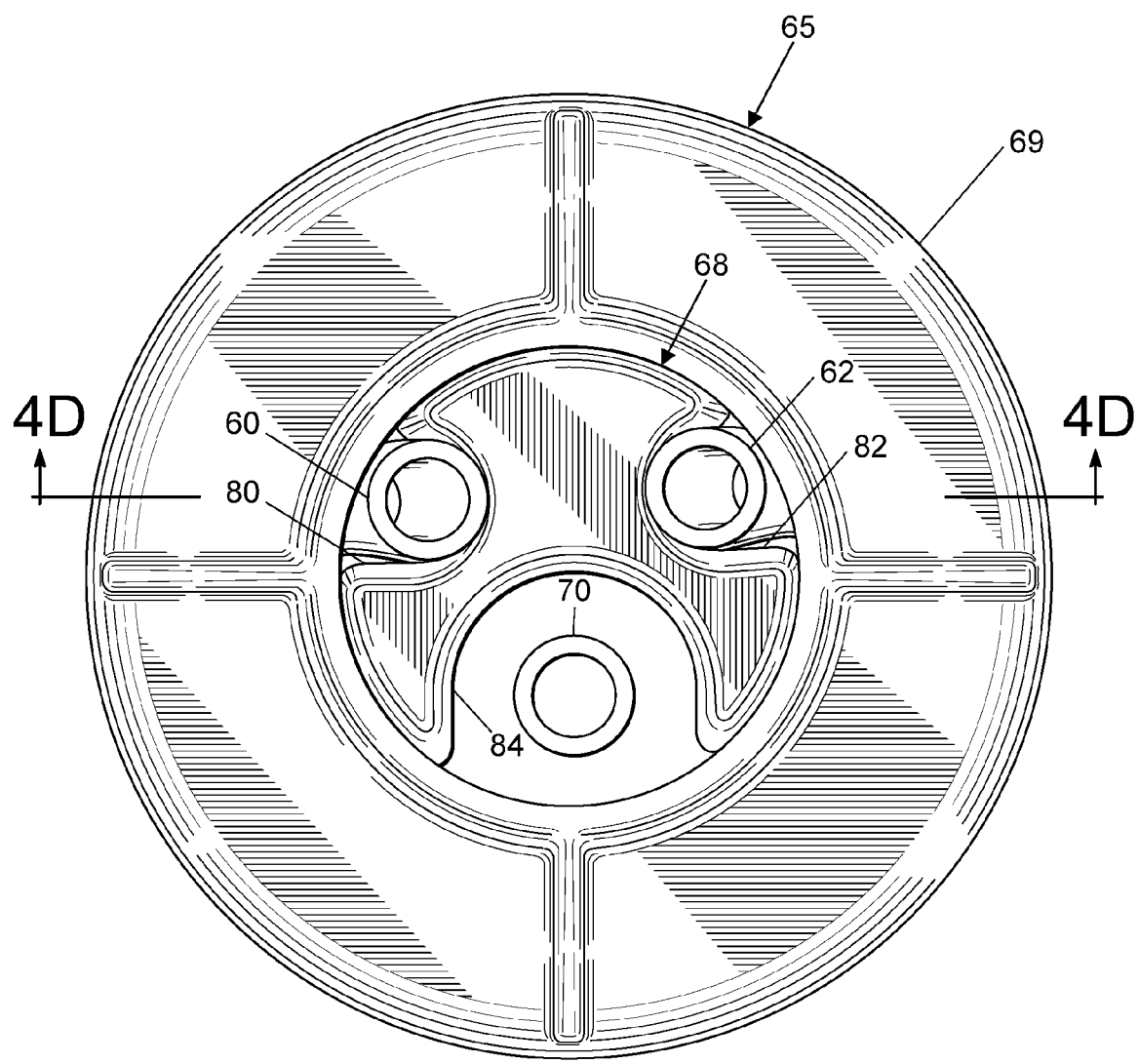
FIG. 4E is a diagram showing a top view of a component of the probe assembly in FIGS. 4A, 4B, and 4D.

As best illustrated in FIG. 4D, the channels 80, 82 are defined to provide slight draft angle 76, such as about 2 degrees, to the extension tubes 60, 62. This draft angle 76 causes the extension tubes 60, 62 to flare apart inside the container. Advantageously, this flare reduces the likelihood that the probes 56, 58 and extension tubes 60, 62 will come into contact and give a false reading without the use of horizontal cross bars or other structural elements to physically separate the extension tubes 60, 62. By avoiding the use of horizontal cross bars, the draft angle also facilitates insertion of the extension tubes 60, 62 through standard openings in the containers 18, 20, 22. More advantageously, it has been determined that films of viscous products tend to form on horizontal surfaces, which often provides a conduction path between the probes 56, 58 long after the level of the product has dropped below the level of the probes 56, 58. The draft angle 76 thereby reduces false product level indications caused by viscous products clinging to the probe assembly 26.

When the probes 56, 58 are in contact with air, the impedance between the probes 56, 58—and ultimately the leads 64, 66—is very high because the only electrical connection between the probes is through air. When the product contacts the probes 56, 58, a less resistive electrical path is created between the probes 56, 58, which reduces the impedance between the probes 56, 58 and ultimately the leads 64, 66. This change in impedance between the leads 64, 66 alters the operation of the detector circuit 40 as previously described with respect to FIGS. 3A-3C, which causes the processor 38 or drive logic 46 to appropriately activate alarms.

Figure 5:
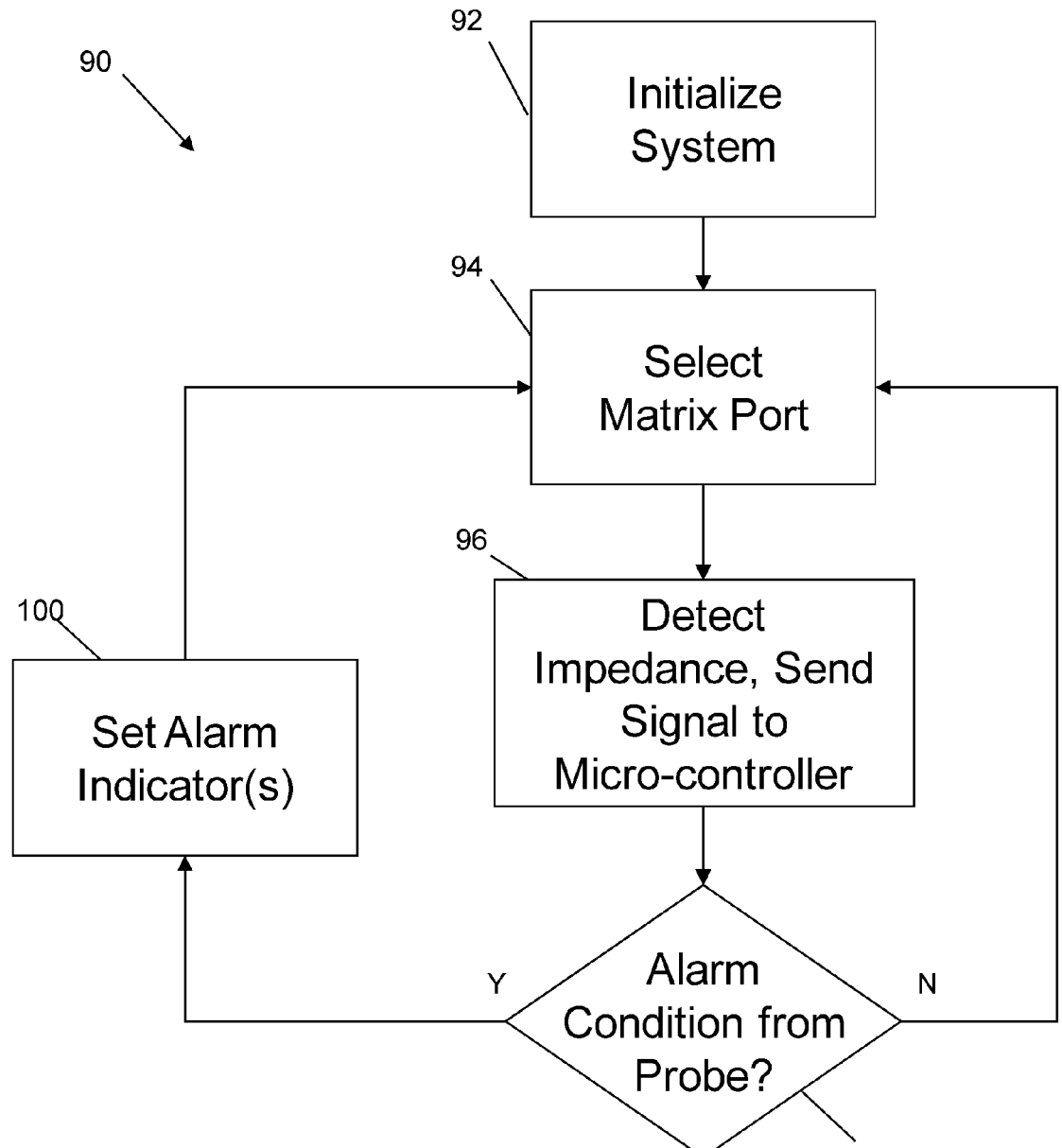
FIG. 5 is flow chart illustrating the operation of the multi-probe monitoring unit.

FIG. 5 is a flowchart 90 that illustrates a method of detecting that the level of the product is either above or below a set point level for a multi-probe configuration, such as that illustrated in FIG. 2, in accordance with embodiments of the invention. In block 92, the system is initialized. During initialization, the probe monitor program 53 polls each electrical input port 31 by sequentially coupling the electrical input port 31 to the detection circuit 40. Initialization of the system is triggered when power is applied to a multi-probe monitoring unit 30 that was previously unpowered. If the detection circuit 40 outputs a signal indicating that there is a high impedance present on the selected electrical input port 31 (such as a low frequency oscillating signal) the probe monitor program 53 will determine that a probe assembly 26 is not connected to that electrical input port 31. In this event, the probe monitor program 53 will flag the selected electrical input port 31 so the electrical input port 31 is not monitored for a low product condition during operation of the multi-probe monitoring unit 30. If the detection circuit 40 outputs a signal indicating that the electrical input port 31 is coupled to an electrical load characteristic of a probe assembly 26 in contact with product, the probe monitor program 53 will flag the electrical input port 31 so that the electrical input port 31 will be monitored for a low product condition during operation of the multi-probe monitoring unit 30. Advantageously, the multi-probe monitoring unit 30 thereby automatically detects which electrical input ports 31 are connected to probe assemblies 26 during initialization, facilitating set up of the chemical dispensing system 10. Once all the electrical input ports 31 of the multi-probe monitoring unit 30 have been polled, the probe monitor program 53 is be ready to begin monitoring the chemical dispensing system 10 for the low product condition.

In block 94, an electrical input port 31 of the multi-probe monitoring unit 30 for which monitoring is enabled may be selected. The selected electrical input port 31 is electrically coupled to the input 41 of detection circuit 40 by the switch matrix 42, thereby electrically coupling the corresponding probe assembly 26 to the detection circuit 40. To provide a visual indication of which electrical input port 31 is currently being monitored, the probe monitor program 53 will cause the channel LED 44 associated with the electrical input port 31 in question to periodically light. The electrical input ports 31 are selected sequentially starting with a first electrical input port to which an attached probe assembly 26 was detected during system initialization. When the probe monitor program 53 comes to an electrical input port 31 that is flagged as not being associated with a probe assembly 26, the probe monitor program 53 may continue on to the next electrical input port 31 without coupling the electrical input port 31 to the detection circuit 40, or alternatively may simply ignore the output 43 of the detector circuit 40 while the detector circuit is coupled to the electrical input port 31.

In block 96, the probe monitor program 53 monitors the output 43 of the detection circuit 40 for a period of time, such as about 0.5 seconds, to determine if the detected impedance across the probe assembly 26 indicates a low product condition. If a low product condition is indicated, an alarm flag may be set for that electrical input port 31. Alternatively, the probe monitor program 53 may also require that a low product condition be indicated for the same probe assembly 26 for several consecutive polling periods, such as three periods, before setting the alarm flag to reduce the occurrence of false alarms. If an alarm conditions exists (i.e., the alarm flag is set) for the monitored electrical input port 31 ("Yes" branch of decision block 98), then the probe monitor program 53 proceeds to block 10 where an appropriate alarm indicator is set. If an alarm flag is set for a particular electrical input port 31, the channel LED 44 associated with that electrical input port 31 will change state from a periodic illumination to a continuous illumination to provide an indication to the operator as to which container 18, 20, 22 is running out of product.

In response to detecting a low product condition, the probe monitor program 53 will illuminate the local alarm LED's 48 as well as cause the local alarm buzzer 50 and/or remote alarm 36 to indicate a low product condition has been detected. To activate the remote alarm 36, the multi-probe monitoring unit 30 provides a suitable signal, such as a 12 volt DC signal capable of powering the remote alarm unit 36. In some embodiments, the remote alarm unit 36 may be a stand-alone unit 32 configured to alarm when supplied with power. If the alarm flag is not set for the monitored electrical input port, indicating that there is no alarm condition ("No" branch of decision block 100), then the process continues at block 94 where the next electrical input port 31 of the switch matrix 42 is selected. The multi-probe monitoring unit 30 thereby sequentially monitors the electrical input ports 31 connected to probe assemblies 26 to detect a low product condition.

The probe assembly 26 is also capable of being used as a stand-alone probe that does not communicate with a multi-probe monitoring unit 30, such as when there is only one container of product being monitored. In this configuration, the probe assembly 26 may be connected directly to the stand-alone unit 32. The stand-alone unit 32 includes the detection circuit 40 and drive logic 46 configured to light a channel LED 44 when the probe assembly 26 is in contact with product in a container 18, 20, 22. The stand-alone unit 32 is further configured to light the local alarm LED's 48 and/or local alarm buzzer 50 when the probe assembly 26 is not contacting the product. The stand-alone unit 32 may thereby be used without the multi-probe monitoring unit 30 to monitor a single container 18, 20, 22. Multiple probe assemblies 26 may also be operatively deposed within a single container 20 (FIG. 1) to provide level threshold indications for a number of set levels of product in the container, such as high-medium-low. In these embodiments, the probe monitor program 53 will determine the level within a number of level set points based on the outputs from the selected probe assembly 26 from the switch matrix 42 or other multiplexer and light an appropriate LED indicating the level set point of the product in the container 18, 20, 22.

Figure 6A:
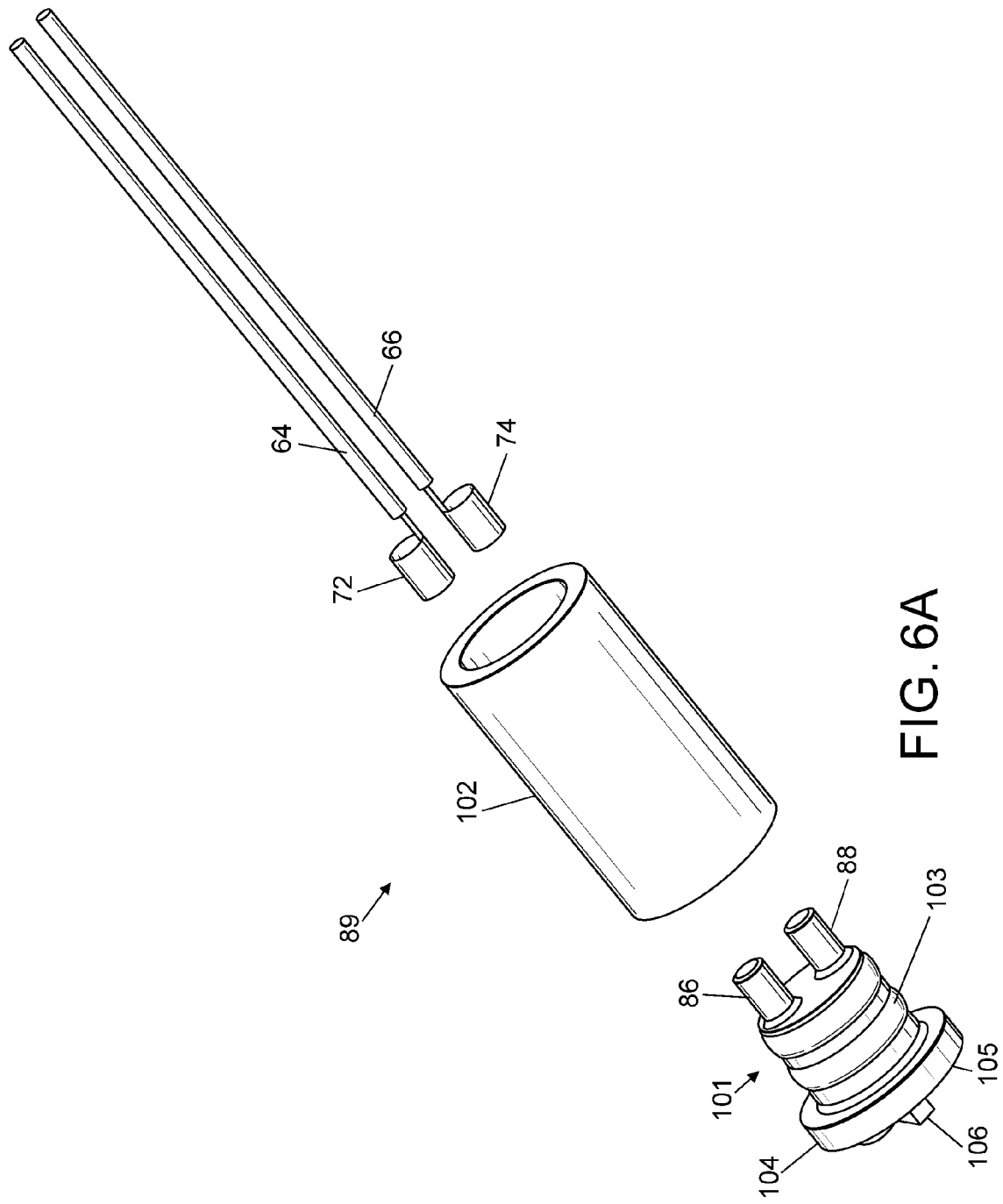
FIG. 6A is an exploded isometric view of an alternative probe assembly configuration.
Figure 6B:
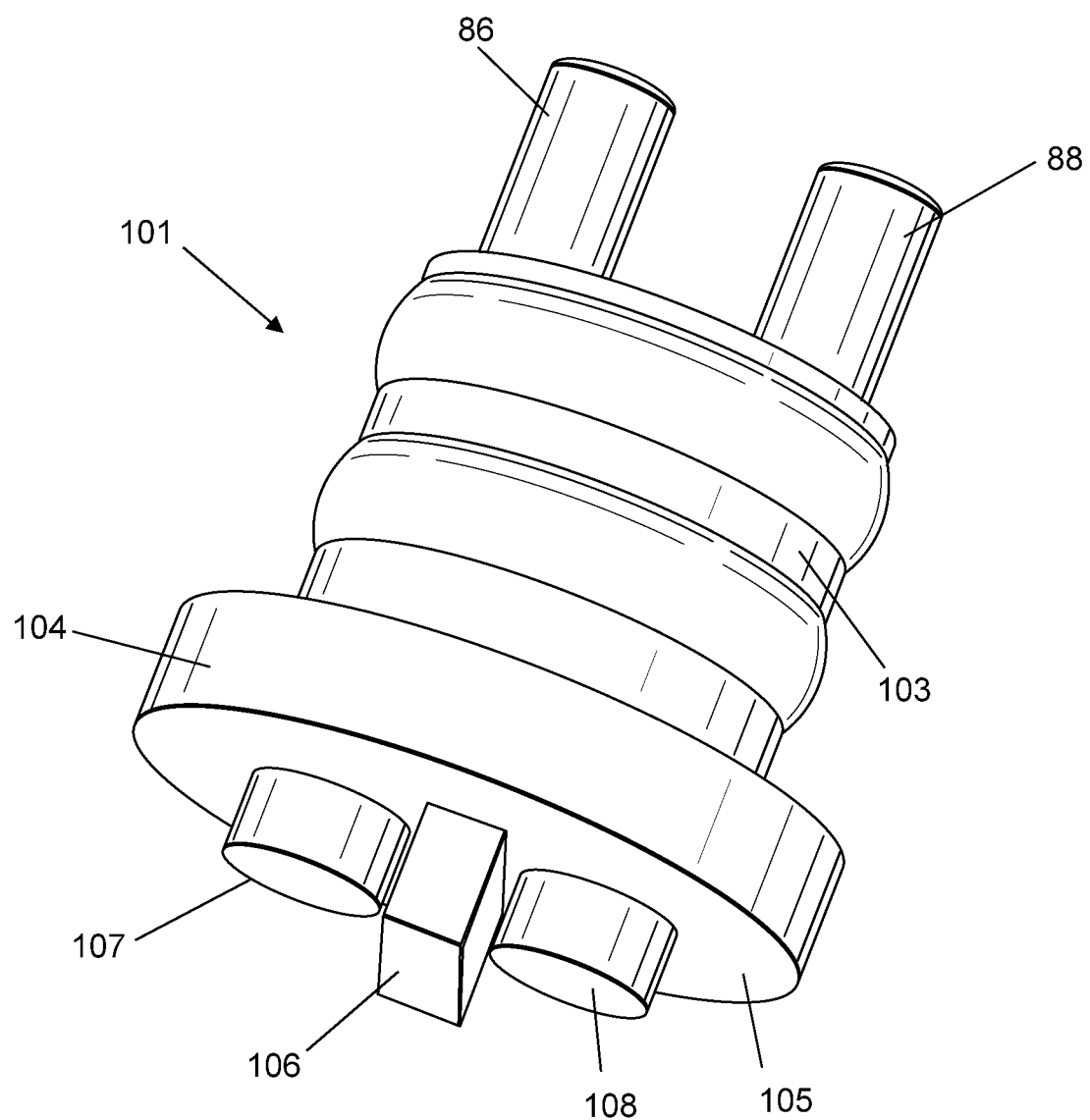
FIG. 6B is an isometric view of the probe of the probe assembly illustrated in FIG. 6A.

FIGS. 6A and 6B illustrate an alternative embodiment of a probe assembly 89 that includes conductive probes 86, 88 situated in a probe housing 101. The housing 101 is constructed from material that electrically isolates the probes 86, 88. Similarly as described with respect to probes 56, 58 in FIGS. 4A-4D, the probes 86, 88 are constructed from a conductive material such as polypropylene infused with carbon; which has the durability to be placed into the harsh chemical environment and provide an electrical connection at a given resistance when an electrical connection is made between the probes 86, 88. The electrical leads 64, 66 are connected to the corresponding conductive probes 86, 88 and provide the electrical connection to the multi-probe monitoring unit 30 or standalone unit 32 as the case may be.

The probe assembly 89 may be mounted through the containers 18, 20, 22 or may be mounted on an inside wall of the containers 18, 20, 22 as appropriate. To assist with the mounting and to assist on protecting the electrical connections to the conductive probes 86, 88, a collar 102 may be placed on the assembly around a first portion of the housing 103. A second portion 104 of the housing that is integral with the first portion 103 has a planar face 105 through which ends 107, 108 of the conductive probes 86, 88 extend, which can be best seen in FIG. 6B. A protrusion 106 formed in the housing 101 protrudes from the planar face 105 and is positioned between the extended ends 107, 108 of the conductive probes 86, 88 further electrically isolating the probes. Similarly as previously described with respect to FIGS. 4A-4E, when the ends 107, 108 of the probes 86, 88 are in contact with air, the impedance between the probes 86, 88 and ultimately the leads 64, 66 is very high, as the only electrical connection between the probes is through the air over the protrusion 106 separating the ends 107, 108. When a conductive chemical solution or product contacts the ends 107, 108, a less resistive electrical path is created between the ends 107, 108, which reduces the impedance between the probes 86, 88 and ultimately the leads 64, 66. This change in impedance based on contact with air or the product causes the detection circuit 40 to provide signals to the processor 38 so that the probe monitor program 53 may appropriately activate alarms.

Figure 7:
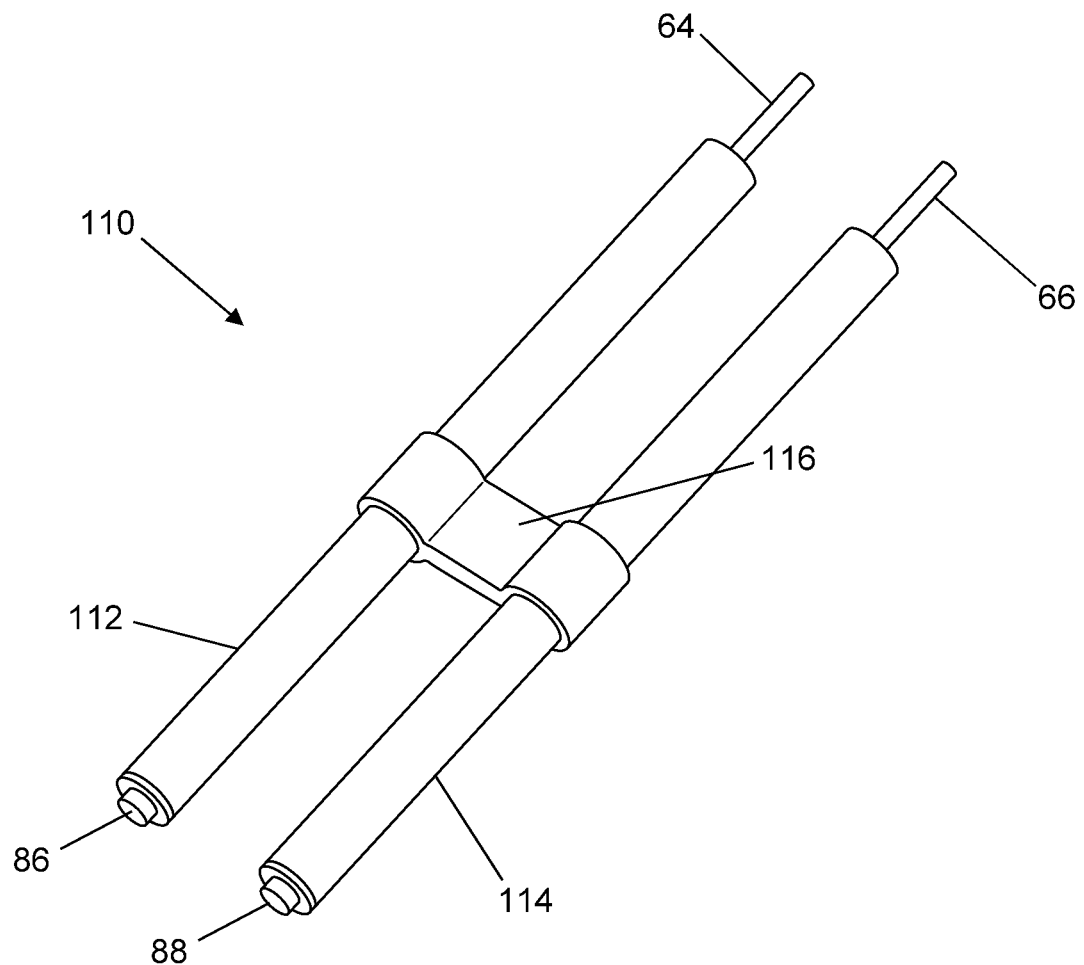
FIG. 7 is an isometric view of another alternative probe assembly configuration.

FIG. 7 illustrates yet another alternative embodiment of a probe assembly 110 including conductive probes 86, 88 each situated in a respective tube or housing 112, 114. The housings 112, 114 is constructed from material that electrically isolates the probes 86, 88, such as polypropylene. A spacer 116 may be coupled to the housings 112, 114 and maintains the housings 112, 114 and ultimately the conductive probes 86, 88 at a set spaced distance from one another. As with the previously described embodiments, the probes 86, 88 are also be constructed from industry proven materials, such as polypropylene, to assist in resisting chemical attacks from the chemical solutions. And also similar to the embodiments described above, to provide the needed electrical connection from the conductive chemical solution to the detection circuitry, a conductive material, such as carbon or carbon fibers, is infused into the polypropylene. As discussed above, this infused material has the durability to be placed into the harsh chemical environment. Additionally, the carbon provides an electrical connection at a given resistance when an electrical connection is made between the probes 86, 88. The detection circuit 40 utilizes this characteristic to provide a means to detect conductive fluids without fouling as described above. The electrical leads 64, 66 are connected to the corresponding conductive probes 86, 88 and provide the electrical connection to the detection circuit 40. As with the embodiments above, the probe assembly 110 may be mounted through the containers 18, 20, 22 (FIG. 1) or may be mounted on an inside wall of the containers 18, 20, 22 as appropriate.

Similar to the embodiments discussed above, when the probes 86, 88 are in contact with air, the impedance between the probes 86, 88 and ultimately the leads 64, 66 is very high, as the only electrical connection between the probes is through the air between the gap produced by the spacer 116 coupled to the housings 112, 114. When a conductive chemical solution or product contacts the probes 86, 88, a less resistive electrical path may be created between the probes that reduces the impedance between the leads 64, 66. This change in impedance based on contact with air or the product may be used by the detection circuit 40 and/or the processor 38 to appropriately activate alarms or illuminate indicators as discussed above.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A probe assembly for detecting a level of a product in a container, the probe assembly comprising:
  a cap coupleable to the container and having a first channel and a second channel;
  a first extension tube positioned within the first channel and having a top end and a bottom end so that the top end projects upwardly from the cap and the bottom end projects downwardly from the cap;
  a second extension tube positioned within the second channel and having a top end and a bottom end so that the top end projects upwardly from the cap and the bottom end projects downwardly from the cap;
  a first probe having a first end disposed within the bottom end of the first extension tube forming a fluid tight seal with the first extension tube, and a second end opposite the first end, the second end projecting outwardly from the bottom end of the first extension tube to contact the product;
  a second probe having a first end disposed within the bottom end of the second extension tube forming a fluid tight seal with the second extension tube, and a second end opposite the first end, the second end projecting outwardly from the bottom end of the second extension tube; and
  a lid separate from the cap and configured to secure the cap to the container, the lid holding the first extension tube in place against the first channel and the second extension tube in place against the second channel when coupling the cap to the container.

2. The probe assembly of claim 1 wherein the first and second channels define a draft angle between the first extension tube and the second extension tube.

3. The probe assembly of claim 1 wherein the cap further comprises a third channel for access to the interior of the container by a product pick up tube extending therethrough.

4. The probe assembly of claim 1 wherein the lid is rotatably securable on the container to secure the cap with respect to the container without rotation of the cap.

5. The probe assembly of claim 1 wherein the first extension tube is slidably adjustable in the first channel and the second extension tube is slidably adjustable in the second channel.

6. The probe assembly of claim 1 wherein the first and second conductive probes comprise polypropylene infused with a conductive material.

7. The probe assembly of claim 1 further comprising:
a first electrical lead passing through the first extension tube and operably coupled to the first end of the first probe; and
a second electrical lead passing through the second extension tube and operably coupled to the first end of the second probe.

8. The probe assembly of claim 7 wherein the first and second electrical leads are operably coupled to the first ends of the first and second probes by clip leads.

9. The probe assembly of claim 6 wherein the conductive material is carbon.

10. The probe assembly of claim 9 wherein the conductive material is carbon fiber.

11. The probe assembly of claim 1 wherein the first and second conductive probes each comprise a circumferential ring, and each fluid tight seal is formed by contact between the circumferential ring and the corresponding extension tube.

12. The probe assembly of claim 11 wherein the circumferential ring is a barbed ring.

13. The probe assembly of claim 11 wherein each circumferential ring is one of a plurality of circumferential rings comprising each of the first and second probes.

* * * * *